United States Patent

[11] 3,581,045

[72] Inventors Rudolf Panschow;
Herbert Russbuelt, Hannover; Volker Suhr, Garbsen, Germany; Werner Ullmann, Locarno, Switzerland
[21] Appl. No. 774,080
[22] Filed Nov. 7, 1968
[45] Patented May 25, 1971
[73] Assignee A G fur Industrielle Elektronik AGIE Locarno, Switzerland
[32] Priority Nov. 14, 1967
[33] Switzerland
[31] 15863/67

[54] DIGITALLY CONTROLLED ELECTROEROSION MACHINE
12 Claims, 5 Drawing Figs.
[52] U.S. Cl. ................................................ 219/69
[51] Int. Cl. ................................................ B23p 1/12
[50] Field of Search ........................................ 219/68, 69, 69 (C), 69 (F), 69 (G), 69 (V)

[56] References Cited
UNITED STATES PATENTS
2,974,216  3/1961  Ihoue ........................ 219/69(V)
3,475,578  10/1969  Vasiliev et al ............... 219/69(V)

Primary Examiner—R. F. Staubly
Attorney—Werner W. Kleeman

ABSTRACT: A program-controlled electroerosion machine is described having a novel numerical control arrangement incorporating a computer interconnected with novel supporting and controlling apparatus. The subject inventive control arrangement operates so as to detect from an information-recording medium a desired travel path of relative movement between the electrode and workpiece and, from such detected information, digital pulses are produced and applied to incremental drive means such as stepping motors to effect the relative movement. The subject invention incorporates the provision of a reverse storage means incorporated to receive the digital drive pulses and store the same in a sequential manner. In the event of a short circuit or other disturbance at the work gap, the novel reverse storage means causes relative movement to be effected in a reverse fashion to retrace the desired path of movement until the disturbance is eliminated. Subsequent thereto, normal forward operation of the control apparatus proceeds.

3,581,045

DIGITALLY CONTROLLED ELECTROEROSION MACHINE

BACKGROUND OF THE INVENTION

This invention generally relates to electroerosion machines and particularly concerns electroerosion machines of the type provided with numerical or program-controlled electronic feeding arrangements for effecting relative movement between the machining electrode and the workpiece.

Numerical or program-controlled electroerosion machines per se are known in the prior art and generally utilize electronic control arrangements and other components which have been adopted from known numerical control systems designed for conventional machines and machine tools, in combination with driving mechanisms for the electrode and/or workpiece. These control arrangements for conventional machine tools inherently are not suitable nor are they designed for the particular control problems and the like which are peculiar to and arise in electroerosive metal working. Thus, with the prior-art adopted numerical control systems, modifications of one type or the other have been necessary in an attempt to take into account some of the more typical and basic problems involved with electroerosive metal working. Such modifications to prior art control arrangements involve the expenditure of much technical engineering time and are normally accomplished, if at all, only at high cost. Moreover, since only relatively minor changes in the individual component elements and the like can normally be made when modifying the prior art numerical control systems to make them operable in the electroerosive process, the resultant modified control systems still retain their inherent conventional machine control characteristics thus not operating in a truly satisfactory manner with electroerosion apparatus. For example, a number of disadvantages are seen with such modified numerical control systems, such disadvantages including their expense in engineering time and cost with respect to their modification discussed above, a quite low precision of control of the relative movement between the machining electrode and the workpiece with respect to the work gap, limited selection possibilities of the various travel curves described by the relative movement and a disadvantageous constant rather than variable speed of this relative movement.

SUMMARY OF THE INVENTION

Thus, from the above, it should be apparent that a need exists in this art for a numerical programmed control arrangement, the basic design of which inherently and specifically is directed toward the control of an electroerosion machine, such numerical control arrangement eliminating the disadvantages known to the prior art. It is the primary object of the instant invention to provide such a control arrangement.

Another more specific yet equally important object of the subject invention is the provision of a numerical control arrangement for electroerosive metal working having relatively simple design and having an inexpensive manufacturing and operating cost, such numerical control arrangement utilizing components that are generally commercially available.

A further object of the subject invention is the provision of a numerical control system or arrangement for electroerosive metal working, such system or arrangement having minimum spatial dimensions due to the utilization of integrated circuit elements and miniaturized component parts. By virtue of the small size contemplated herein, external disturbing influences on the control arrangement are generally eliminated with only a reasonable expenditure for isolating and screening material. As should be appreciated, this feature is particularly advantageous in the field of electroerosive metal working since this form of machining produces a very high interference level which, even at great distances, can produce troublesome effects on the working machine. As should be further appreciated, the aforesaid construction would serve to reduce the expenditure necessary for wiring.

Another object of the subject invention is the provision of a numerical control system or arrangement for electroerosive metal working which affords high reliability in operation due to the utilization therein of reliable state-of-the-art electronic components.

Yet another object of the subject invention is the provision of a numerical control system for electroerosive metal working, which system affords very high accuracy in operating. The subject inventive system is contemplated to provide for the coordinate correction of the desired travel curve of relative movement between the electrode and the workpiece as fed from an information record whereby compensation for the thickness of the machining electrode and other variables is achieved.

Still another object of the subject invention is the provision of a numerical control system for electroerosive metal working wherein the width of the work gap which is variable in accordance with the nature of the workpiece material, the speed of feed advance, and the electrical parameters of the work gap are all taken into consideration and effectively balanced out to provide stable operation throughout a machining process. In principle, the subject inventive numerical control system is capable of effecting this balancing operation as well as the above-mentioned coordinate correction of a travel curve either manually or in an automatic fashion.

Another object of the subject invention is the provision of a numerical control arrangement for electroerosive metal working wherein the travel curve described by the relative movement between the machining electrode and the workpiece during an erosion process can also be described in the reverse direction, such reverse operation taking place in the event of disturbances at the work gap, this reverse travel operation being effected by means of a separate storage means for this purpose.

Another object of the subject invention is the provision of a numerical control system for electroerosive metal working specifically designed to afford high machining accuracy by automatically correcting for many variable parameters encountered during the machining operation.

Still another object of the subject invention is the provision of a numerical control system which is operative, either in a manual or automatic fashion, to control the speed of the relative movement between the machining electrode and the workpiece. In the automatic mode in this respect, the subject invention contemplates the regulation of the speed of relative movement in response to electrical quantities measured at the work gap and thus enables the speed of relative movement to be adapted individually to each separate electroerosive machining operation. From a hardware standpoint, the subject invention contemplates to utilize a varying frequency feed pulse generator to effect changes in the speed of relative movement, each pulse of the feed pulse generator starting a computing cycle determinative of the subsequent digital feed step.

Yet another object of the subject invention is the provision of a numerical control system for electroerosive metal working wherein any error in relative movement between the machining electrode and the workpiece during each digital step are continuously taken into account. The position coordinates as calculated by the subject inventive system normally must be rounded off, upwardly or downwardly, during the relative movement along nonlinear curves because of the digital feeding. Since these rounding-off error could be added together in a cumulative manner from individual curve sections, the operation of the subject invention with respect to continuously correcting for such deviation errors becomes obviously important.

The above objects and features as well as other objects and features of the subject invention are implemented in a relatively simple manner by the provision and interconnection of a computer device with novel supporting and controlling apparatus therefor, the output of the computer device or means effecting relative movement between the machining electrode and workpiece of a so-called step-motor driven electroerosion machine.

In respect, and from a standard standpoint, the desired relative movements are initially recorded on an information medium, such movements being either linear or curvilinear nature. Under the control of a main programming or control means and two subroutine or secondary control means, this initial recorded information is operated upon by the computer device to form feed advance pulses for the stepping motors of the drive for the electroerosion machine, which pulses effect the positioning and movement of the apparatus. Of note is the fact that, with the subject inventive control apparatus, linear desired relative motion between the electrode and the workpiece is transformed into a plurality of stairlike steps along the desired linear curve. Where curvilinear motion such as circular motion is desired, such motion is transformed into a plurality of chords of the desired arcuate path.

The subject inventive control arrangement is capable of effecting machine operation in one or a plurality of planes, and by virtue of the provision of a novel feed advance generator means having a variable timing frequency, the actual speed of the relative movement produced in the electroerosion apparatus can be controlled, either manually or automatically, as a function of conditions appearing at or around the work gap and the like.

The subject invention further contemplates the provision of a novel backward or revere storage means, preferably taking the form of ring counter, which serves to temporarily store the feed advance pulses emanating from the computer device utilized to actuate the relative movement drive. In this manner, whenever a short circuit occurs at the work gap, the entire machine can be stopped and the path of travel of the electrode with respect to the workpiece can be retraced in a reverse or backward direction until the short circuit is removed. At this point, the backward or revere storage means would again function to operate in a forward manner bringing the position of the electrode with respect to the workpiece back to its initial point whereat the short circuit initially occurred.

BRIEF DESCRIPTION OF THE DRAWINGS

The subject invention will be better understood both as to its component parts and operation from the following detailed description of preferred embodiments thereof, such detailed description referring to the appended drawing, wherein.

DETAILED DESCRIPTION OF PREFERRED INVENTIVE EMBODIMENTS

Figures 1, 2, 4, 5:
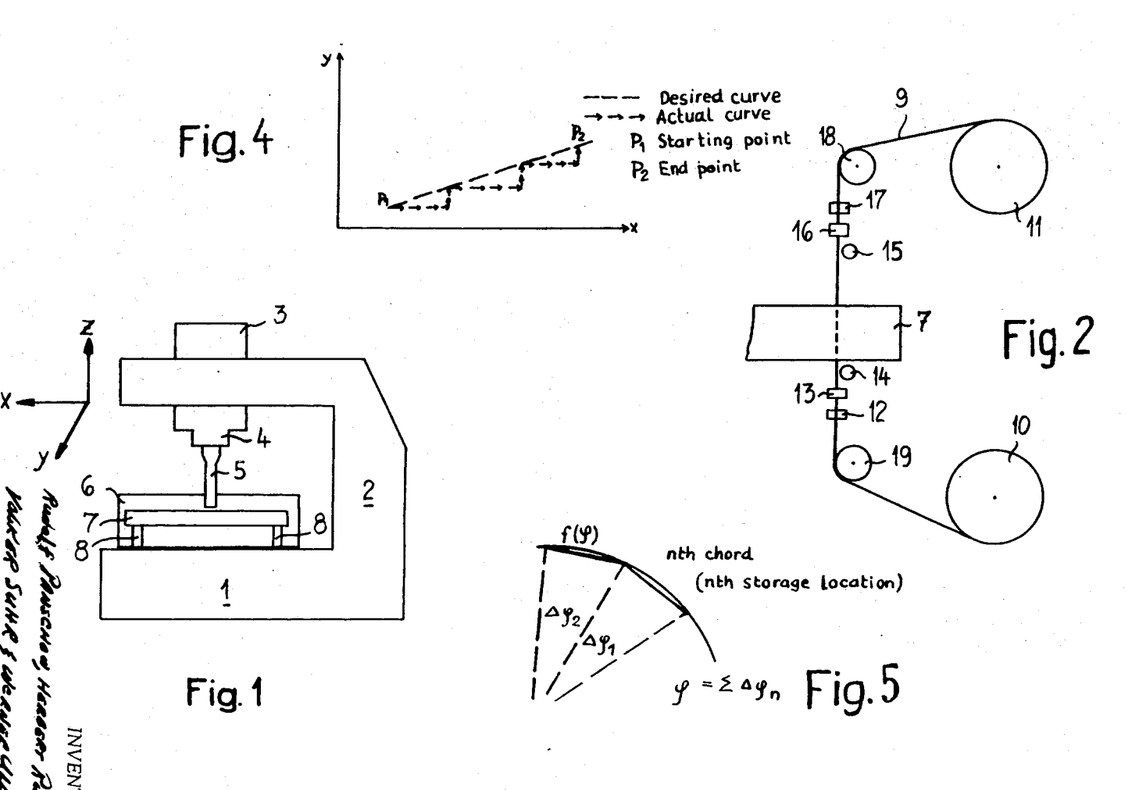
FIG. 1 depicts a schematic illustration of an electroerosion machine comprising a normal machining electrode.
FIG. 2 depicts a schematic illustration of a wire-form machining electrode adapted to be fitted into the electrode holder of the erosion machine of FIG. 1.
FIGS. 4 and 5 respectively illustrate the operation of the arrangement when the travel path between the workpiece and the electrode is linear and curvilinear

Referring now to the machining operation, the electroerosion machine illustrated in FIG. 1 is seen to substantially comprise a workpiece table 1 having an upstanding column or support 2, on the upper end of which an electrode feed device 3 is mounted. The electrode feed device itself comprises an electrode holder 4 in which a machining electrode 5 is placed in known fashion. A vessel 6 is provided in which is situated a workpiece 7 to be machined, the workpiece 7 being mounted and secured to the workpiece table 1 via supports 8. A dielectric or electrolytic liquid may be present in known fashion in the vessel 6. The liquid cover the workpiece 7 or, alternatively, the workpiece 7 may be sprayed with the liquid only at the point at which the electroerosive machining takes place between the workpiece 7 and the electrode 5.

During an electroerosive operation, relative movement is effected between the electrode 5 and the workpiece 7 and such relative movement may take place in the plane disposed between the X and Y coordinate axes, or between the X and Z coordinate axes, or between the Y and Z coordinate axes of the coordinate system illustrated in FIG. 1. The relative movement between the electrode 5 and the workpiece 7 may be produced in one or more of the above-described planes since the worktable 1 is contemplated to be moveable in each of these planes. In this instance, therefore, a forward stepping member or means such as, for example, digitally responsive motor, would be provided in or on the worktable for each direction of movement in the three coordinate directions. Since such apparatus is well known and forms no part of the instant invention, an illustration of the same in the drawings is not necessary for an understanding of the instant invention.

As will be appreciated, the relative movement discussed above may also readily be effected by moving the entire feed device 3 along with the electrode holder 4 and the machining electrode 5 in these planes, while the worktable 1, in this case, would remain stationary. As is known in the art, it is likewise readily possible for the displacement of the worktable 1 to take place only in one or two planes, while the displacement of the electrode holder 4 may take place in the remaining plane. Lastly, it is to be noted that the worktable 1 may be rotated about a point which may lie at or outside the center of a circle. These many forms of relative movement between the machining electrode and the worktable in a given coordinate system are produced by the operation of the forward digital stepping member or means discussed above. Considering the many different ways in which the forward stepping members or means may be incorporated in, on or at the worktable 1 and/or in the feed device 3, only general stepping motors for the X, Y and Z coordinate directions will be referred to in the following discussion of the entire control system depicted in FIG. 3, the particular placement of these motors either in the worktable 1 or in the feed device 3 not being critical.

When the relative movement between the electrode 5 and the workpiece 7 in the erosion machine of FIG. 1 is controlled in response to the feeding of digital information, then depressions or recesses of the desired type are obtained in the workpiece. It is thus possible, by electroerosion to produce engravings having depressions and curves of any given particular form in the workpiece 7. The feed or input information representative of the desired travel path of relative movement may initially be produced by mean of a keyboard, teleprinter microphone, character character reader, contact reading device, punch-tape reader, punch-card reader, magnetic tape device, or by picture scanning with a Braun tube as However, the particular means utilized is not critical but rather is dependent upon what variety of information-recording means might be the most suitable for any given particular task or job of electroerosive metal working, and as it should be appreciated, the particular information feed means may differ from job to job. It should also be noted that the subject inventive numerical control system may be employed either for spark machining or for electrolytic machining and thus the term "electroerosive machining or metal working" as utilized herein is to be construed as incorporating both machining techniques.

Referring now to FIG. 2, a further embodiment of an electroerosion machine is depicted, this electroerosion machine utilizing a wire electrode 9 in place of the electrode 5 of the machine in FIG. 1. The wire electrode 9 consists of a brass or copper wire having a diameter of 0.05 to 0.5 mm. The length of wire 9 is on the order of a few hundred meters, depending upon the diameter chosen. The wire is initially wound upon a brake drum 10, as illustrated, and is taken up or wound up onto a so-called driving drum 11 through the agency of various rollers described below. The wire is passed from the brake drum 10 over a guide roller 19 by means of presser roller 12, 13, 14, onto further presser rollers 15, 16, 17 and then onto a guide roller 18 and finally to the driving 11. The presser rollers 12 through 17 are so arranged and constructed that the wire electrode 9 bears against them at three points on each side. Rollers 12 through 17 may also comprise pins of ceramic material which do not move themselves but which have a very low coefficient of friction.

The workpiece 7 which is to be machined is situated between the presser rollers 14 and 15. As should be apparent, varied contours may be formed in the workpiece with the aid of the wire electrode 9. The machining method employing such a wire electrode is well known and therefore further description of such technique is unnecessary. It will suffice to point out here that the parts illustrated in FIG. 2 are all situated on a nonillustrated which may be gripped in the electrode holder 4 instead of the electrode 5 such that the wire electrode can then machine the workpiece by electroerosion techniques. To provide power for the electroerosive process, one pole of an operating voltage supply is applied to the workpiece and the other pole of the operating voltage supply is applied to a spindle of the guide roller 18 which constitutes a conductive connection to the wire 9. Guide roller 18, drums 10 and 11, and the presser rollers 12 through 17 are insulated from the wire 9.

The driving drum 11 as well as the brake drum 10 are connected to a nonillustrated driving motor and a braking motor, respectively, by means of magnetic clutch arrangements such that the wire electrode is uniformly maintained in a taut condition. It has proved desirable in this art for the wire electrode 9 to be guided from the bottom upwardly when the workpiece 7 is to be machined by electroerosive techniques.

Figure 3:
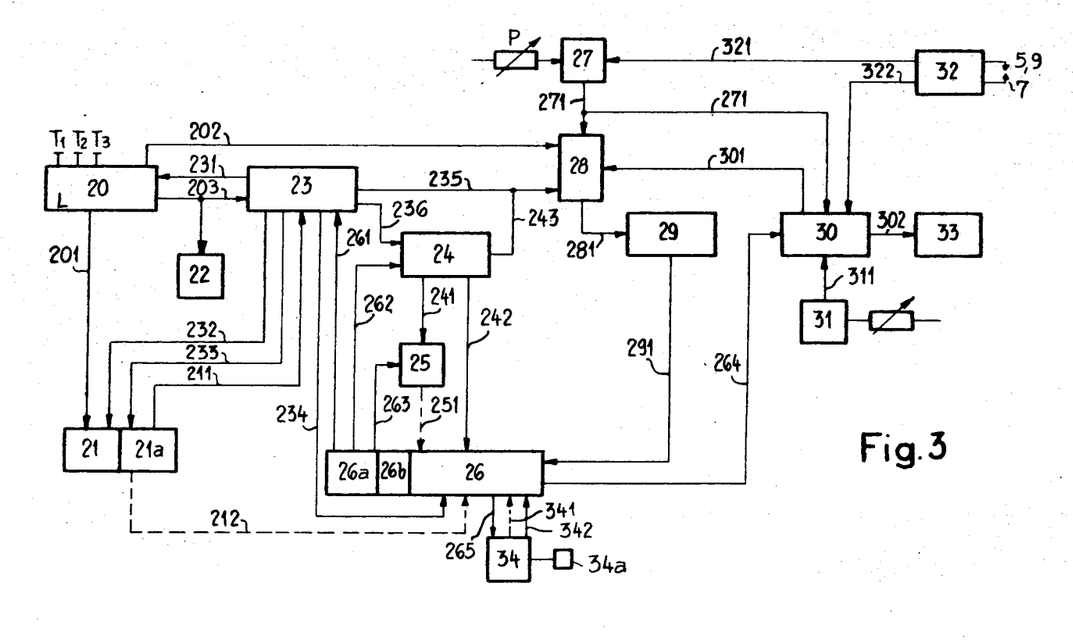
FIG. 3 depicts a block diagram of the entire control arrangement.

Referring now to FIG. 3, a block diagram of the entire numerical control arrangement effecting and controlling the relative movement between the electrode 5 or 9 and the workpiece 7 fixedly clamped to the worktable 1 is illustrated. A central control unit 20 is provided and comprises a lamp and pushbutton panel as well as registers for adjusting the desired feed advance speed and other quantities and parameters necessary for continuous electroerosion operation. The central control unit 20, in effect, initiates the operation of the entire electroerosion machine and constantly monitors the operation thereof. Due to the adjusting regulators and pushbutton panel, influencing actions may be applied during the electroerosion operation.

By mean of an addition function, a coordinate correction of the information on the information-recording means may be manually performed from the central control unit or panel to take into account the thickness of the work gap and to shift the travel curves that are initially programmed. The thickness of the work gap differs in "coarse" and "fine" machining by electroerosive techniques such that the travel curve described by the relative movement of the electrode and the workpiece must be shifted in a compensatory manner. The pushbuttons provided on the central control unit 20 provide control functions for the electroerosive operation, such functions comprising, for example, "ready for operation," "start of program," "program stop without erasure of partial control content," and "stop with erasure of partial control content." As should be apparent, further pushbuttons or the like are provided for further typical control functions necessary in effecting a proper electroerosion machining. For purposes of illustration, all pushbuttons provided on the central , unit 20 are denoted by reference numerals $T_1$, $T_2$, and $T_3$. The lamp panel provided on the central control unit 20 is denoted by reference letter L and comprises a plurality of lamps utilized for indicating particular states of operation of the numerical control system such as, for example, "ready for operation," "program written in," "program proceeding," "feed advance taking place with electrode," "feed advance taking place without electrode," "disturbance at the work gap," "disturbance at the reading-in device," and so forth. Again, for sake of clarity of illustration, the many pushbuttons and lamps provided are not individually shown on the central control unit 20. The meanings of the pushbutton and lamp designations and functions as described above will be more fully explained in the following detailed description of the control arrangement operation.

Initially, a pushbutton labeled "ready for operation" would be actuated and the entire numerical control system would be then set into operation. The first block of information carried on the particular information-recording medium would then be fed into a reading device 21 via conductor 201. Reading 21 may, for example, comprise a punched tape reader, punched card reader, teleprinter, a magnetic tape device, or a picture scanner in accordance with the information-recording medium initially utilized. In any case, the information-recording medium would contain the values determinative of the relative movement desired between the workpiece 7 and the electrode 9. These values consist of a symbol indicative of the form of the movement desired, such as for example, a circle, straight line, parabola, etc., and also of the particular coordinate data of the particular movement or curve section. When a straight line is desired to be machined, the differences $\Delta_x$, $\Delta_Y$, and the quadrant in which this movement or curve section is to lie are recorded on the information-recording medium. These values are derived from an actual shop or technical drawing and the general program can easily be set up from these shop or technical drawings in known manner and facilitated by the utilization of problem-oriented computer language such as, for example, EXAPT, ALGOL, or FORTRAN. In the event that a circular section is to be machined, the symbol for a circle as well as the radius and the angle $\Phi_o$ of the point of origin of the arc in relation to the axis, for example, and the change of this angle from the point of origin to the end point, as well as the direction of rotation of the circle, are all recorded on the information-recording medium. In the event that an elliptical section is to be followed, a similar procedure is adapted. Likewise, such similar procedure is followed for a parabolic curve form. However, if it is desired to reduce the cost of the fixed-value storage required, it is possible, for example, to approximate parabolic curve forms by portions of circles or ellipses.

Now, again referring to the operation initiated by the actuation of the "ready for operation" pushbutton, it is assumed that the first block of information has already been fed into the reading device 21. Next, the "start of program" pushbutton would be operated or actuated which brings about, through conductor 201, reading and transfer of the first block of information from the reading device 21 into a buffer storage means 21a. At the same time, operation of the "start of program" pushbutton starts a computing and control pulse generator 22, the pulses from which are applied through nonillustrated conductors to all parts of the control circuit. Additionally, a main program or control means 23 is set into operation by actuation of the "start of program" pushbutton. The main control means 23 causes the buffer storage means 21a, through the conductor 233, to apply the symbols indicative of the type of curve desired as now stored therein to the main control means 23 through conductor 211. Further, the main control means 23 causes the stored coordinate data from the buffer storage means 21a to be applied to a computer 26 through a conductor 212. Computer 26 functions to recode this applied data into machine language with the aid of instructions emanating from the main control means 23 through conductor 234, and brings this recoded data into the intermediate storage means 26a.

The main control means 23 thereafter serves to activate the reading device 21 through conductor 232 so that the reading device 21 reads the next block of information from the information-recording medium into the buffer storage means 21a. This subsequent information block remains in the buffer storage means 21a until the main control means 23 again supplies, through conductor 233, a signal for the reading out of this information which takes place as described above.

Continuing, it has been shown that the symbols from the first data block of information on the information-recording medium have been stored in the main control means 23 whereas the coordinate data from the first block of information has been stored in the intermediate storage means 26a. Further operation on this given block of information would take place in accordance with the symbol that is stored.

Assuming, for the moment, that the stored symbol comprises a "straight line" symbol and is present in the main control means 23, main c4ntrol means 23 serves to set a gate 28 through conductor 235. Forward feed pulses emanating from the feed pulse generator 27 through conductor 271 are present at this gate. The clock frequency of the feed pulse generator 27 may be manually set by means of potentiometer P or may also be effected by a supervisory device 32 through a conductor 321, the supervisory device 32 being situated at the work gap between the workpiece 7 and the machining electrode 5 or 9 whereby variations in the electrical quantities of the work gap such as current, voltage, or frequency, may be measured in known manner and compared with a desired value. Upon variations of these electrical condition at the work gap, the feed pulse generator 27 would change its clock frequency which, as will be described below, changes the feed rate of relative movement between the electrode and workpiece. Since the supervisory device 32 discussed above is well known, no further explanation of the same is necessary.

The feed pulses generated by the feed pulse generator 27 through conductor 271 pass through the now set gate 28 and a conductor 281 to a subroutine or secondary control means 29. Secondary control means 29 cooperates with the computer 26 and functions as a linear interpolator in that the secondary control means 29 is actuated once at each clock feed pulse and activates computer 26 by way of conductor 291 to cause computer 26 to "work off," or develop by the method of interpolation described hereinbelow, the proper feed or drive pulses for the desired straight line travel curve from the coordinate data which is stored in the intermediate storage means 26a. The actual feed or drive pulses developed by computer 26 through this method of interpolation of the data coordinates stored pass from computer 26 through conductor 264 into a backward or reverse storage means 30 and, from the backward or reverse storage means 30, pass through conductor 302 to the stepping motors 33 thus actuating the same. Stepping motors 33 which, as described above, produce the relative movement between the electrode 5 or 9 and the workpiece 7, have been simply illustrated as a single block in FIG. 3. As described above, however, such stepping motors may be mounted either in the worktable 1 to which the tool 7 is secured, and/or in the feed arrangement 3, as desired.

When the data coordinates stored in the intermediate storage means 26a have been "worked off" and the proper feed or d7ive pulses have been developed by the action of the secondary control means 29 with the aid of computer 26, a switchback occurs through conductor 261 to the main control means 23 which, via conductor 235, causes the gate 28 to close. This closing or resetting of gate 28 interrupts the feed or clock pulses along line 281. The main control means 23 then activates the buffer storage means 21a through conductor 233 once again such that the symbol evaluation and the recoding of the next block of data coordinate information present in the buffer storage means 21a takes place in the above-described manner. As described above, the novel numerical control arrangement of the subject invention has now caused a linear relative movement between the electrode and the workpiece in accordance with and in response to the first block of information present on the information-recording medium.

Now, let it be assumed that the block of information on the information contain a symbol for a curvilinear section such as a circle or parabola which differs from the straight line symbol as well as radius and angular data information as discussed above. The initial operation of the novel numerical control means is similar to that described above. Yet, the symbol for the curvilinear section as would be stored in the main control means 23 after the initial transfers, in this case causes a fixed-value storage means 25 to be set in accordance with the programmed initial angle of the curve section through the action of the intermediate storage means 26a into which the radius and angular coordinates of this particular curve section have been written and stored similarly as discussed with respect to linear travel path operation above. In the fixed-value storage means 25, a number of compartments or registers are provided and the $\Delta_X$, $\Delta_Y$ coordinates for individual chord sections of a unit circle, for example, are stored therein. Attention is directed to FIG. 5 in this regard. At the same time, the main mean 23 sets or actuates another subroutine or secondary control means 24 through conductor 236. Under the action of the secondary control means 24, the coordinates of each stored chord of the unit curve section are introduced through conductor 251 into computer 26 from the fixed-value storage means 25 in accordance with a predetermined order of readout. Under control order generated by the secondary control means 24 via conductor 242, computer 26 converts the unit coordinates of each chord section of the unit circular travel path into coordinates for the actual chord sections of the desired curvilinear travel path in accordance with the reference and radius quantities stored in intermediate storage means 26a. The converted coordinates of the actual chord sections are then returned into the storage means 26a. The secondary control means 24 then sets gate 28 via conductor 243 to cause the feeder clock to travel therethrough.

As already described, feed pulse generator 27 applies these feed pulses to the now set gate 28 through conductor 271. At each feeder clock pulse, secondary control means 29, which is coupled and connected to the computer 26 through conductor 291 is set into operation, and, with the aid of computer 26, "works off" those coordinates of the actual chord of the desired curve section which are stored in the intermediate storage means 26a, as described above In essence, the coordinates for each actual chord section define straight lines and thus, further operation of novel control arrangement is such that each straight line chord section is treated in same manner as above discussed with reference to an initial programmed "straight line" travel path. The resultant feeder drive pulses determined for the individual coordinates of each chord by the method of interpolation discussed above pass from the computer 26, through conductor 264 and then into the backward or revere storage means 30, from which they are passed to the stepping motors 33 by way of conductor 302. When one particular chord of the desired curvilinear travel path has been "worked off" by this interpolation technique and drive pulses representative thereof have been generated, computer 26 changes over from the secondary control means 29 through conductor 262 to the secondary control means 24 which serves to block the gate 28. The fixed-value storage means 25 is then stepped forward by one place in accordance with the direction data fed in. The coordinates of the next succeeding chord section the desired curvilinear path then pass into the computer 26 and, in turn, and, in turn, are converted in the manner described above. Gate 28 is thereafter opened or freed again operating secondary control means 29 initiating the interpolation technique and this process continues in cycles until all the programmed number of storage locations in the fixed-value store has been "worked off" and actual feed or drive pulses generated for the entire curved travel path of the data block. This operation is supervised in the intermediate storage means 26a. Computer 26 then changes back to the main control means 23 through conductor 261 and the next block of information stored in the buffer storage means 21a evaluated.

During the above-described process of interpolation of curvilinear path the conversion of chord, circuit 26b the rounding-off error that have occurred. These rounding-off errors are continuously taken into account and are acted upon by circuit 26b that no appreciable deviation or error can occur over the whole length of the curve which is composed of a number of individual chord sections. This operation ensures increased precision of the relative movement between the machining electrode 5 or 9 and the workpiece 7 circumstances.

The operation of the novel control arrangement with respect to straight line and curvilinear relative movements should now be apparent. Yet, further noteworthy features of the invention bear discussion. An attachment means 34 is provided in the novel numerical control arrangement for the purpose of correcting or rather "adjusting" the coordinates. As is known in the electroerosion arts, the travel curve along which the relative movement between the electrode 5 or 9 and the workpiece 7 must take place differs in accordance with the particular type of machining effected. The travel curve, of course, depends upon the width of the work gap, the thickness of the electrode, the feed advance speed and upon the electrical parameters of the work gap such as voltage, current, and repetition frequency. These values as described above, vary even during a single machining operation such that the actual curve to be formed by the relative movement must be "shifted" in relation to the curve form as recorded on the information-recording medium. This shift or coordinate adjustment is effected by computer 26 activated through conductor 342 from attachment mean 34 in a manner such as to convert and adjust the coordinates before storage in the intermediate storage means 26a. This correction or adjustment operation is effected through conductors 265, 341, in accordance with the correction value a fed from the attachment means 34. Reference numeral 34a denotes an adjusting device which may be suitably installed at the work gap for measuring the parameters thereat. Such parameters may also be manually preset into the adjusting means 34. Thus, automatic regulation and adjustment as well as manual regulation or adjustment may be effected either simultaneously or separately, as desired. The coordinate correction or adjustment a described above is advantageous with virtually any form of curve of relative movement between electrode 5, 9 and the workpiece 7, since accuracy during all types of machining operation is thus ensured.

The novel numerical control arrangement for electroerosive machines comprising the instant invention performs many other advantageous functions in addition to the primary function of relative movement control discussed above. For example, if the feed to be stopped at the stepping motor 33, such that manipulation of one form or another may be effected at the work gap such as replacement of the machining electrode or removal of products of erosion from the work gap, the "program stop without erasure" pushbutton may be actuated on the central control unit 20. In this instance, the gate 28 would be rendered nonconductive to the feed pulses on conductor 271 via a signal on conductor 202. The entire program would be stopped at this point. Now, by subsequent actuation of the "program start" pushbutton, this blocking action is cancelled out and normal operation of the apparatus then resumes once more.

Further if a short circuit occurs in the work gap, for example supervisory device 32 would apply a signal through conductor 322 to the backward or reverse storage means 30. The backward or reverse storage mean 30 would withhold the feed or clock pulses from the generator 27 from passing through gate 28 via conductor 301 and would commence to run backwards under control of an adjustable clock generator 31. The location or point from which this backward running commences is marked or flagged in the backward storage means 30. Since the backward storage means, during normal operation has continuously stored via conductor 302 pulses applied to the stepping motor 331 for the distance last traveled, these pulses then pass in a reverse sequence to the stepping motors 33 whereby backward or reverse movement, in effect a retracing of the travel curve, takes place along the travel curve or curve path already machined. Depending upon the particular storage capacity of the backward or reverse storage means 30, the distance previously traveled by movement of the stepping motor 33 will be stored for some variable time. Depending upon construction of the stepping motors 33, a single pulse may, for example, represents a distance of one-thousandth to one-tenth of a millimeter. Of course, the larger the number of pulses which can be stored in the backward storage means the greater is the distance stored.

When the backward movement has been initiated upon starting of the backward storage means 30, such backward movement continues until the short circuit in the work gap which initiated such movement has been removed. This removal is signaled to the backward or reverse storage means 30 via conductor 322 b superior device, 32 which, as known, is connected to electrode 5 or 9 as well as the workpiece 7. The clock generator 31 is stopped and the feed pulse generator 27, which has again been actuated the supervisory device 32, applies its feed pulses to the backward storage means 30 through conductor 271. Backward storage means 30 then moves further toward the location in which the marking or flagging been initially applied in the storage means upon the initial occurrence of the short circuit. During this forward movement, of course, pulses are again applied to stepping motors 33 in the forward direction through conductor 302. As soon as the location at which the short circuit initially occurred has been reached, backward storage means 30 "releases" the feed pulses at gate 28 through conductor 301 such that normal operation again may be resumed through gate 28, conductor 281, secondary control means 29, conductor 291, computer 26, conductor 264, and backward storage means 30.

If a further short circuit occurs at the work gap during forward running of the backward storage means 30, i.e., during normal operation, the backward storage means immediately commences reverse operation again. This operation may be repeated as often as is desired. If the storage capacity of the backward storage means 30 is insufficient, it remains stationary at the last location during the backward or reverse running. This state or mode of operation is signaled at the lamp panel of the central control unit 20. It is then still possible to remove the short circuit at the work gap via external action and to commence the operation of the backward storage means by depression of the proper pushbutton initiating forward travel along the desired curve. The backward storage means 30 will be more fully described hereinbelow and forms an important element of the subject novel control arrangement.

In contrast to other varieties of machine tools, it is necessary in machines operating by electroerosion techniques for the workpiece 7 and the machining electrode 5 or 9 to, at any time, be able to run backwards under the control of the machining point and then to subsequently run forwards again. In a continuous travel control, this reversible movement must take place on the travel path previously described.

Referring again to FIG. 3, the reversible movement concept discussed above is achieved by virtue of the fact that pulses applied to the stepping motors 33 are simultaneously stored in the backwards or reverse storage means 30 as will be discussed in further detail. The distance which can be traveled in the backward or reverse direction thus depends upon the storage capacity of the backward storage means, as discussed. The backward storage means 30 is preferably constructed as a ring storage register such that, when it has reached its capacity, the particular storage locations first occupied are erased and subsequently occupied by the pulses newly presented along conductor 264. In the event of a short circuit at the work gap, the backward storage means can be read in the opposite or reverse direction of rotation without causing the erasure of information contained therein. The backward or reverse running proceeds in this manner until the short circuit at the work gap is removed, as discussed. Now, newly instituted forward running of the apparatus takes place in accordance with the information contained in the backward storage means. Here again, no erasure of this information takes place since the above-described operation may be frequently repeated. The backward or reverse running may alternatively take place until the full capacity of the storage means is reached. As discussed above, this occurrence is signaled at the central control unit 20. When the backward or reverse running commences, the storage location reached is marked or flagged by a work which is excluded in the normal or forward feeding direction. Thus, in backward running, the reaching of the full capacity of the storage means is recognized while, in forward running, the point at which the backward or reverse movement was started is recognized. Thus, it is unnecessary in this instance for the storage locations that are read to also be counted. The backward or reverse running is effected by the adjustable clock pulse generator 31 which is specific to the storage means 30 and is connected thereto through conductor 311. Forward running of the backward storage means is effected by the feed pulse generator 27, the timing frequency of this feed pulse generator being controlled by the supervisory device 32. Thus, relative movement between the workpiece and the electrode may be braked or stopped at the point at which a defect in the work gap, such as a short circuit, has occurred.

The frequency of the feed pulse generator 27 may be set in accordance with the particular mode of operation, either manually by means of potentiometer P or automatically by means of an analogue control signal delivered through conductor 321 from the supervisory device 32 in accordance with the particular conditions present in and at the work gap. Through this technique, optimum speed of feed advance is automatically chosen consistent with and in accordance with the conditions in and at the work gap.

It is to be noted that the supervisory device 32 also serves to signal a mechanical defect at the electrode 5 or 9. For example, if the wire electrode 9 is broken, the feed pulse generator 27 is stopped as is the case in the event of a defect in the workpiece.

It is likewise possible with the control system of the subject invention to cause the device to pass through a curve without the processing electrode 5 or 9 being disposed in the electrode holder. This technique or mode of operation is designated by the expression "without servo" and is normally employed for setting up subsequent operation of the machine. Another form of operation in which the electrode 5 or 9 is disposed in the electrode holder 4 in the normal working condition is designated by the expression "with servo." These two modes or forms of operation are signified and called for in the program by the commands "with servo" and "without servo," respectively. If a change of these commands or orders occurs between two blocks of data information, the main control means 23 would serve to activate the control unit 20 through conductor 231 such that control unit 20 renders gate 28 nonconductive via conductor 202. This operation is the same as that previously described at the outset with reference to the actuation of the "program stop without erasure" pushbutton. When the working electrode 5 or 9 has been introduced into the electrode holder 4, the program may be started once again by actuation of the "program start" pushbutton. The inventive installation is then stopped by the designation "end of program" as would appear in the last block of information on the program utilized.

The following description will serve to more clearly explain the novel function and operation of the fixed-value storage means 25 as well as the interpolation of nonlinear curves as initially discussed in a more general manner above. In the interpolation of nonlinear curves, the travel curves to be described are preferably approximated by polygonal lines forming chords. The coordinates of the chord sections forming each polygonal line in relation to a unit path are stored in the fixed-value storage means 25, the particular storage location in the storage means 25 being determined by the angle $\Phi$ between the vector of a reference axis and the position vector of the starting point of the chord concerned. Attention is directed to FIG. 5 in this regard. Fixed-value stores of this kind may be employed for all functions comprising a constant $f(\Phi)$. By conversion of the coordinates of the chord with a programmed comparison quantity, a proportional increase or reduction of the curve may be effected.

In the case of a circle, only the X and Y coordinates of the chord portions from 0° to 45° are stored in steps of 1° or less in dependence upon the desired resolution, due to the periodic nature of the function. A reversible counter capable of counting up to 45 is incorporated in the fixed-value storage means and enables the desired storage location to be set. After setting this storage location to 0, pulses are stored therein in accordance with the number of degrees of the angle whereby the reversible counter is counted upwardly during the first 45 pulses and downwardly during the next 45 pulses and so forth. The number of reversals of direction is, at the same time, counted in a one-out-of-eight counter also included. The content of this one-out-of-eight counter determines the allocation of the coordinates and the signs of the stored values. At the first pulse (45°), an interchange of the X and Y coordinates of the chord sections takes place. At the second pulse (90°), a change of sign of the Y coordinate takes place. At the third pulse (135°), an interchange of the X and Y coordinates takes place again, and the operation continues in a similar cyclic manner. In this manner, a complete circle may be described with the 45 stored chord sections. In the above-mentioned manner, the complete circle is described in a counter-clockwise direction. Yet, the direction of rotation may be reversed by a variation in the programming of the initial counting direction of the first counter and of the evaluation of the content of the second counter. If the coordinates of the chords are converted with different comparison quantities in the X and Y directions, an ellipse would be obtained.

The method of interpolation for straight lines in which the secondary control means 29 operates in conjunction with the computer 26 will be described in more detail hereinbelow. In this instance, the travel path for the straight line is approximated by a stepped curve having digital or stepwise advances in both coordinate directions with the end points of the stepped curve lying on the desired curve and with the deviations of the stepped curve from the desired curve being less than the inaccuracies caused by the erosion process. Attention is directed to FIG. 4 of the drawings wherein this stepped curve approximation is illustrated.

The method of interpolation utilized determines the ratio in which drive pulses must pass to the coordinate drives of the stepping motors so as to effect the feed advance or relative motion between the electrode and workpiece that is necessary for describing the path curve of travel. This interpolation method will be described for convenience and by way of example with reference to the X–Y plane. In this instance, $\Delta_X$ and $\Delta_Y$ denote the coordinate differences of the end points of the straight line. From these differences, the quotient ($\Delta_X$ divided by $\Delta_Y$) is formed, $\Delta_Y$ continuously being subtracted from $\Delta_X$ until the remainder is smaller than $\Delta_Y$. $\Delta_X$ is then added to the remainder and $\Delta_Y$ is again continuously subtracted from the sum until the remainder is again smaller than $\Delta_Y$, whereafter $\Delta_X$ is again added, and so forth.

Now, if $\Delta_X$ is smaller than $\Delta_Y$ from the outset, one or more additions of $\Delta_X$ initially takes place because the remainder check is always monitored and reported. If the sum then exceeds $\Delta_Y$, $\Delta_Y$ is again subtracted. The remainder thus immediately becomes smaller than $\Delta_Y$ and additions must then be made until the next subtraction is possible and so forth.

Each pulse from the feed pulse generator 27 initiates a subtraction or addition in accordance with the above-described computing conditions and modes. In the case of subtraction, a pulse is applied to the X-drive, and, in the case of addition, a pulse is applied to the Y-drive. In this manner, the speed of the feed advance is proportional to the frequency of the feed pulse generator. With the pulses applied to the X or the Y drive, a counter preset with $\Delta_X$ or $\Delta_Y$ is simultaneously counted backwards and, upon reaching the reading 0, signals the end of the interpolation. This process will be more fully explained with reference to the following example in which it is assumed that $\Delta_X$=11 and $\Delta_Y$=3. The pulses are then applied to the stepping motors denotes by X and Y in accordance with the following table.

| Coordinates | | Pulses applied to motors | |
|---|---|---|---|
| X | Y | X | Y |
| 11 | 3 | | |
| 8 | | 1 | |
| 5 | | 1 | |
| 2 | | 1 | 1 |
| 10 | | 1 | |
| 7 | | 1 | |
| 4 | | 1 | |
| 1 | | 1 | 1 |
| 9 | | 1 | |
| 6 | | 1 | |
| 3 | | 1 | |
| 0 | | 1 | 1 |

In the foregoing, the entire control arrangement of FIG. 3 has been described only with reference to its control function on a single electroerosion machine. As should be apparent, it is also possible for this numerical control arrangement to control a relatively large number of erosion machines whereby the relative movements or relative displacements between the electrode and the workpiece in each of the plurality of machines are equal. To operate a plurality of such erosion machines, it merely would be necessary for a separate line 322 to be provided for each electroerosion machine running to a common backwards storage means 30 provided for all the erosion machines. Such a combination of the shift programs and the like of a large number of electroerosion machines is desirable in cases wherein the machining electrode is to erode the identical patterns or engravings in the workpiece. However, if each of the plurality of electroerosion machines are to erode a different pattern or engraving in their respective workpieces, then, of course, duplication of portions of the control circuit for each of the electroerosion machines could be separately and respectively employed such that the component parts of the control arrangement which operate at high speed would be better utilized.

Further, in the above discussion, the use of a single electrode 5 in accordance with FIG. 1 or the use of a wire electrode 9 in accordance with FIG. 2 for a single machine has been described. Of course, it is also possible to employ a plurality of electrodes for each electroerosion machine. The electrode holder 4, in this instance, would be adapted to receive a number of electrodes. The use of a plurality of electrodes in a single machine is desirable if a number of erosive treatments are to be simultaneously applied to different points on the same workpiece 7. Likewise, a plurality of workpieces 7 might be attached to the worktable 1 in known manner in which instance, each of these workpieces would be erosively machined by a single electrode. The utilization of a plurality of wire electrodes 9 will be more fully described in the following. As previously mentioned, a number or plurality of units comprising the wire electrode 9 depicted in FIG. 2 could be clamped in an electrode holder 4 of a single electroerosion machine. In this manner, the machining of the workpiece or workpieces provided is effected at a number of different points in a single operation. The wire electrodes 9 may all be of the same diameter and, in this instance, the same geometrical dimensions would be obtained at each of the points at which the erosive working is effected. The wire electrodes may also have different diameters as would be advantageous particularly in the case of simultaneous erosive working of a stamping tool which, as known, consists of a punch and a die. The punch and die must be disposed with a specified clearance depending upon the purpose for which the stamping tool is subsequently to be employed. It is likewise possible to cut a number of curves in a single operation by employing a single unit in accordance with FIG. 2 and by passing the wire electrode 9 a number of times through the workpiece or workpieces 7. This is contemplated to be achieved by arranging the guide rollers 18, 19 differently than as depicted and by deflecting the wire by means of additional guide rollers such that the wire can simultaneously be passed through the workpiece or workpieces at a number of locations. In the electroerosion machining arts, it is generally known that great difficulties are encountered in attempting to observe the progress of the erosion process by the human eye. These difficulties are generally due to the considerable turbidity of the dielectric or electrolytic liquid. When complex figures are to be eroded or machined in the workpiece by the machining electrode, the operator of the machine, who may be required to operate a number of erosion machines simultaneously, is greatly assisted when the actual progress of the erosive machining is clearly recorded. Thus, the instant invention contemplates the transmission of the relative movement between the electrode and the workpiece through a linkage such as a pantograph to a stylus which would thus record on charts or the like mounted on or near the machine the travel curve in the X-Y, Y-Z, and/or X-Z plane. A further means of recording the relative movement resides in the provision of a drawing apparatus mounted parallel with the stepping motors for each individual coordinate, the drawing apparatus receiving the same pulses as the stepping motors of the erosion machine. It thus can be readily appreciated that such a drawing apparatus would comprise a pencil instead of the electrode holder and a drawing paper instead of the workpiece. A drawing apparatus of the type above described is generally known in the art and therefore, its detailed manner of operation need not be fully explained herein. It is to be pointed out, however, that the combination of an electroerosion machine with a drawing apparatus or drawing mechanism is highly advantageous in the production of complex shapes by electroerosion techniques.

It should now be apparent that the objects initially set forth at the outset of this specification have been successfully achieved.

We claim:

1. A program controlled electroerosion machine comprising, in combination: electrode means; workpiece means; incremental drive means for producing a relative movement between said electrode means and said workpiece means in at least one plane; and means for controlling said incremental drive means including:

an information-recording medium having at least one data block thereon containing information representative of the desired travel path of said relative movement;

reading means for reading said information-recording medium;

computer means;

control means for said computer means, said control means being coupled with said reading means and operating said computer means such that digital drive pulses for said incremental drive means are generated in accordance with said information representative of said desired travel path of said relative movement;

adjustable feed generator means coupled with said control means for varying the frequency of said digital drive pulses, whereby the speed of said relative movement can be regulated;

reverse storage means coupled between said computer means and said incremental drive means for continuously and repetitiously storing a predetermined number of said digital drive pulses in sequential arrangement, said reverse storage means normally passing said digital drive pulses to said incremental drive means in a forward sequential manner, whereby said desired travel path of said relative movement is produced; and, monitor means responsive to the presence of predetermined conditions at said electrode and workpiece and coupled to said control means and said reverse storage means for causing said computer means to cease generating said digital drive pulses and for causing said reverse storage means to operate in a reverse direction, said stored digital pulses in said reverse storage means being passed to said incremental drive means in a reverse sequential manner to retrace, in a reverse direction, said desired travel path of said relative movement to eliminate the presence of said predetermined conditions.

2. An electroerosion machine as defined in claim 1, further including means associated with said computer means for causing said computer means to adjust said digital drive pulses as a function of the thickness of said machining electrode and the work gap between said electrode and said workpiece.

3. An electroerosion machine as defined in claim 1, wherein said control means comprises a main control means for receiving information from said reading means relative to the linear characteristic of said desired travel path of relative movement of said electrode and said workpiece, said main control means having two outputs, a first and second secondary control means for curvilinear and linear interpolation respectively, a controllable switching element, one of said outputs of said main control means being directly coupled with said switching element, the other of said outputs of said main control means being connected through said first secondary control means with said switching element, said second secondary control means being connected with said switching element.

4. An electroerosion machine as defined in claim 3, wherein said reading means comprises a buffer storage means for delivering to said computer means information from said information-recording medium relative to the coordinates of said relative movement, an intermediate storage means, and wherein said computer means in association with said control means uncodes said coordinates and delivers said uncoded coordinates into said intermediate storage means.

5. An electroerosion machine as defined in claim 4, wherein said second secondary control means is coupled through said controllable switching means to said adjustable feed generator means and further is coupled to said first secondary control means, said second secondary control means being operably coupled with said computer means for linear interpolation of the coordinates of said desired travel path of relative movement, said second secondary control means carrying out continuous subtraction operations of said coordinates stored in said intermediate storage means.

6. An electroerosion machine as defined in claim 4 further including a fixed-value storage means for storing coordinate values of chords of a unit curvilinear section, said first secondary control means provided for curvilinear interpolation, said main control means, said intermediate storage means, and said fixed-value storage means cooperating to cause said computer means to calculate the coordinates of the curve section of said desired path of travel.

7. An electroerosion machine as defined in claim 6 wherein said first secondary control means is operative to actuate said controllable switching element thereby causing pulses generated by said feed generator means to be coupled with said second secondary control means, said second secondary control means in association with said computer means then converting said coordinates stored in said intermediate storage means by cyclic interpolation into said digital drive pulses applied to said reverse storage means.

8. An electroerosion machine as defined in claim 3, further including circuit means for continuously correcting rounding-off errors of the individual curve sections as occurring in said computer means.

9. An electroerosion machine as defined in claim 3, wherein said reverse storage means is coupled to said adjustable feed generator means, said adjustable feed generator means upon the occurrence of a disturbance at the work gap between said electrode and said workpiece marking a last-written storage location in said reverse storage means.

10. An electroerosion machine as defined in claim 9, further including a separate timing clock generator means for delivering pulses to said reverse storage means for controlling the reverse running of said reverse storage means during its return movement from said marked location.

11. An electroerosion machine as defined in claim 10, wherein said separate timing clock generator means has an adjustable clock frequency for the delivered pulses.

12. An electroerosion machine as defined in claim 1, wherein said reverse storage means comprises a ring storage device having a plurality of registers therein, said ring storage device reading out said digital drive pulses stored therein in a reverse sequential manner until either the storage capacity of said ring storage device is reached or until said predetermined conditions at said electrode and said workpiece no longer exist.